May 3, 1960    L. W. GRAYSON    2,935,275
DISC SHAPED AIRCRAFT

Filed Oct. 20, 1955    6 Sheets-Sheet 1

Leonard W. Grayson
INVENTOR.

BY *[signatures]*
Attorneys

May 3, 1960  L. W. GRAYSON  2,935,275
DISC SHAPED AIRCRAFT

Filed Oct. 20, 1955  6 Sheets-Sheet 3

Leonard W. Grayson
INVENTOR.

BY *Clarence A. O'Brien*
*and Harvey B. Jackson*
Attorneys

Leonard W. Grayson
INVENTOR.

May 3, 1960 L. W. GRAYSON 2,935,275
DISC SHAPED AIRCRAFT
Filed Oct. 20, 1955 6 Sheets-Sheet 5

Leonard W. Grayson
INVENTOR.

Leonard W. Grayson
INVENTOR.

United States Patent Office 2,935,275
Patented May 3, 1960

2,935,275

DISC SHAPED AIRCRAFT

Leonard W. Grayson, Cascade, Mont.

Application October 20, 1955, Serial No. 541,674

3 Claims. (Cl. 244—23)

This invention generally relates to a vehicle construction, and more specifically provides a combination aircraft and land vehicle wherein the device may travel through the air or travel upon a highway with equal facility, wherein the operator of the vehicle may be provided with selective controls for guiding the movement, speed and direction of the vehicle under all conditions.

An object of the present invention is to provide a vehicle construction which may be employed with equal facility as an aircraft or as a land vehicle for traveling on the highways, wherein passengers employing the vehicle may be transported directly to a destination.

It is a well known determent to air travel when the airports are located at relatively long distances from various metropolitan centers. In some cases, the time required to reach the destination within a city takes as long as reaching the airport of the city from a distant point, thereby eliminating some of the advantages of air travel. This is caused essentially by the necessity of landing aircraft in an area having relatively long runways to permit landing and taking off, thereby necessitating the location of airports at rather remote points. This time delay is also caused by considerable delay in changing modes of transportation, such as getting off the airplane, obtaining luggage and getting on another type of conveyance, such as a taxi cab, bus or the like. Accordingly, it is another object of the present invention to provide an aircraft which may land and take off in substantially a vertical direction and may be controlled for any speed of direction of flight and may hover over a designated point, thereby permitting the aircraft to be landed upon highways or streets after which the operator of the aircraft may selectively actuate ground engaging driven wheels and steerable wheels wherein the aircraft may then be driven over highways and streets to the heart of a city, thereby eliminating the time loss in traveling from the airport to the city and also eliminating the time loss necessary in changing modes of travel.

A further object of the present invention is to provide an aircraft which includes in its construction a safety feature including a separable or detachable passenger compartment having a parachute compartment in the upper surface thereof together with a releasable cover wherein the passenger compartment may be detached or ejected from the remainder of the aircraft and lowered safely to the ground by use of the parachute in the event of an emergency, such as a power failure which would normally cause a crash with resultant loss of life.

As an ancillary object, the detachable passenger compartment is constructed in a waterproof manner and may be provided with an outboard motor or other propelling means wherein the passenger compartment may be propelled to the nearest port in the event the emergency landing or crash occurs over a body of water.

A still further object of the present invention is to provide an improved and novel vehicle construction which is primarily designed as an aircraft and constructed substantially in the form of a disk with oval upper and lower surfaces wherein the disk includes a main body or fuselage with a supporting frame universally attached thereto together with control means for varying the angular relation between the supporting frame and the fuselage or body, thereby controlling the movement of the aircraft due to the counterrotating propellers mounted upon the fuselage since the axis of rotation of the propellers may be varied by varying the angular relation between the frame and the fuselage.

Still another object of the present invention is to provide an aircraft in accordance with several of the preceding objects which includes a pair of annular ring members having ring gears secured thereto in facing relation wherein a single drive pinion is provided between the ring members and in engagement with both of the ring members for driving the ring members simultaneously in opposite directions at the same speed, wherein the pinion gear and the ring gear are of the double herringbone type to equalize radial thrust thereby eliminating the necessity for elaborate thrust bearing construction.

Yet another important object of the present invention is to provide an aircraft construction as set forth in the immediately preceding object wherein the annular ring members are provided with radially projecting blades which are pivotal about longitudinal axes, thereby varying the angular position of the blades on each ring independently for varying the torque necessary for turning the propellers formed by the blades for varying the position of the fuselage for controlling the direction of flight of the aircraft in a horizontal plane.

A still further important feature of the present invention resides in the provision of an aircraft having a control mechanism in the form of a steering wheel with a pivotally and vertically movable steering column wherein rotation of the steering wheel to the right or left will control the aircraft for movement in that particular direction, and when the steering column is moved vertically, the aircraft will move in accordance therewith, and when the steering column is pivoted rearwardly or forwardly, the angle of climb or descent of the aircraft will be controlled accordingly, thereby giving the operator or pilot of the device accurate and positive control of the aircraft in all directions of movement.

Other objects of the present invention are to provide a combination aircraft and land vehicle which will be extremely safe and efficient in operation, well adapted for use by armed forces since the device may be landed in a relatively small area due to the vertical take-off and landing qualities thereof, easy to operate as an aircraft or a land vehicle, easy to control, provided with a maximum of safety features, well adapted for its intended purposes and relatively inexpensive to maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now specifically to the drawings, the numeral 10 generally designates the aircraft or land vehicle of the present invention which is substantially disk-shaped having oval upper and lower surfaces, thereby forming substantially a perfect air foil for ease of movement of the aircraft 10 through the air with least air resistance. As specifically illustrated in Figure 4, the upper portion of the aircraft 10 is provided with a passenger compartment generally designated by the numeral 12 and the central portion of the aircraft 10 is generally a main fuselage or body generally designated by the numeral 14 and the bottom of the aircraft 10 is a supporting frame which is generally designated by the numeral 16 wherein the supporting frame 16 and the passenger compartment 12 are normally retained in rigid relation to each other and the fuselage 14 may be pivoted in relation thereto for controlling flight of the aircraft 10 in a manner described hereinafter.

Figure 1:
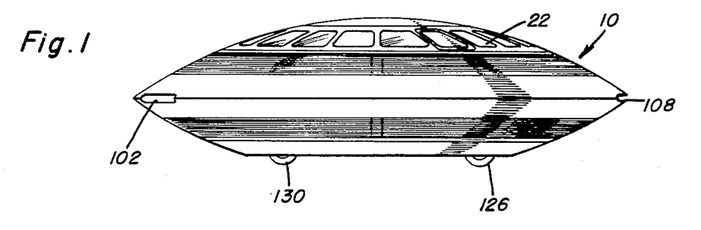
Figure 1 is a side elevational view of the aircraft of the present invention illustrating the shape thereof.
Figure 2:
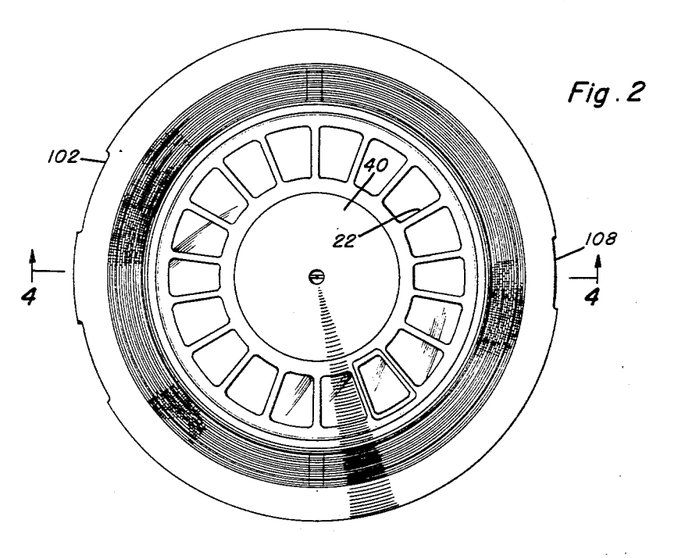
Figure 2 is a top plan view of the construction of Figure 1 illustrating the passenger compartment and the air inlet area.
Figure 3:
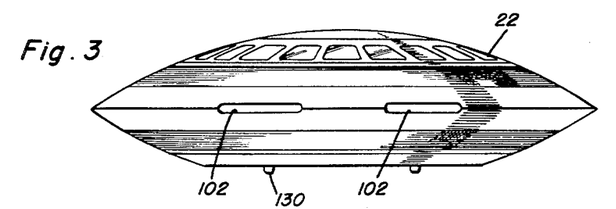
Figure 3 is a front view of the construction of Figure 1 illustrating the air inlet for the driving motor.
Figure 4:
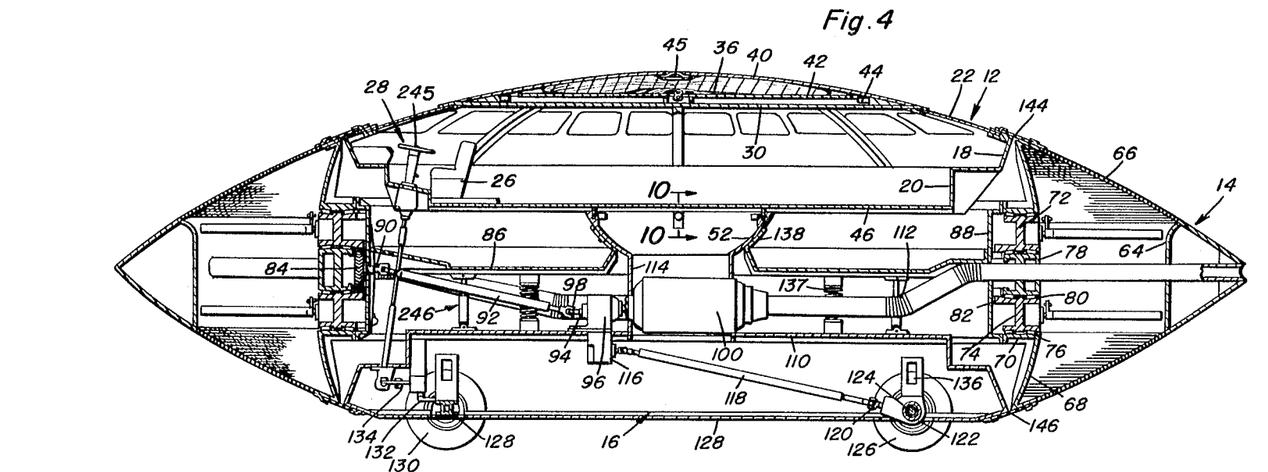
Figure 4 is a vertical sectional view taken substantially upon a plane passing along section line 4—4 of Figure 2 illustrating the details of internal construction of the aircraft of the present invention.
Figure 12:
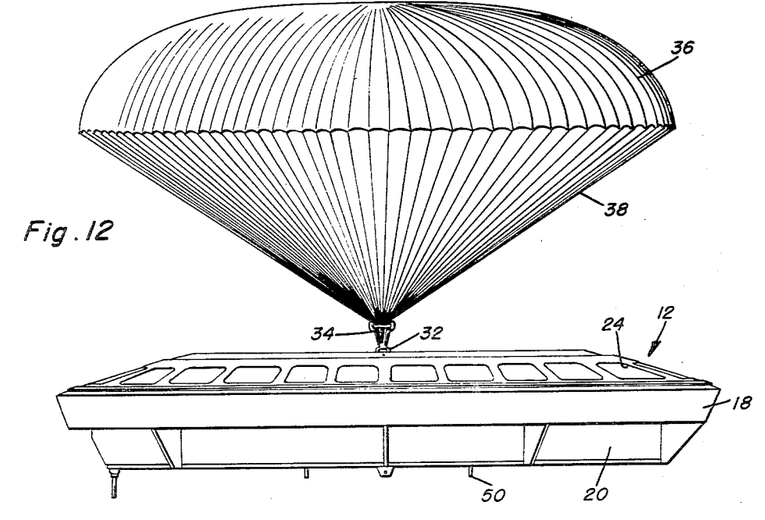
Figure 12 is a side elevational view of the passenger compartment removed from the aircraft with the parachute in extending position for lowering the passenger compartment to the ground surface.

Referring now specifically to Figures 4 and 12, it will be seen that the passenger compartment 12 includes a generally annular or cylindrical side wall 18 having a recessed bottom portion 20 and an inclined upper wall 22 having a series of window openings 24 with glass disposed therein. Although a plurality of seats are not illustrated, it will be understood that seats or other conveniences for passengers may be provided within the passenger compartment 12 and such conveniences may be in the form of seats, berths or the like. Forwardly in the passenger compartment 12 is a seat 26 for the operator of the aircraft 10 together with a suitable control mechanism generally designated by the numeral 28 for manipulation by the operator positioned in the operator's seat 26 for permitting control of the aircraft 10. It also is not illustrated but will be understood that various gauges, dials, safety instruments, radios and the like may be employed and may be provided in the passenger compartment 12 for observation by the operator. Of course, the device may utilize more than one operator, such as a pilot and copilot, and the passenger compartment 12 may be of any suitable and comparative size to permit freedom of movement and comfort to the passengers.

The upper portion of the passenger compartment 12 is provided with a ceiling or partition 30 which is generally flat and provided with an upstanding ring 32 thereon for attachment to the lower end 34 of an enlarged parachute 36 wherein the shroud lines 38 are attached to the ring 32. The parachute 36 is normally enclosed within a curved cover member 40 having a removable bottom 42 thereon with the parachute 36 folded therebetween. Retractible latch means 44 are provided for releasably retaining the cover 40 connected to the passenger compartment 12. However, by releasing the latch means 44, the cover 40 may be removed and the parachute 36 extended due to movement of the cover 40 away from the aircraft 10. A suitable pilot chute may be employed for assuring movement of the cover 40 away from the aircraft 10 if desired, which may be adjusted by any suitable mechanism (not shown). In the upper end of the cover 40 is provided a ring 45 to which may be attached any suitable lifting mechanism wherein the passenger compartment 12 may be released and removed from the remainder of the aircraft 10 for permitting repair of the aircraft 10, as set forth hereinafter.

Figure 10:
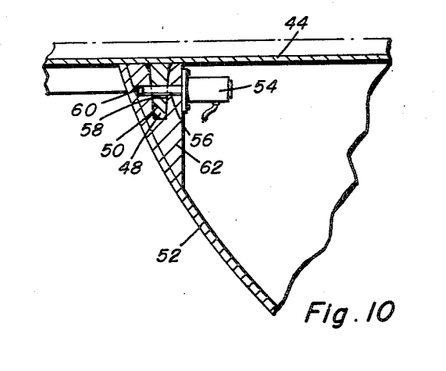
Figure 10 is a detailed sectional view taken substantially upon a plane passing along section line 10—10 of Figure 4 illustrating the solenoid actuating means for detachably latching the passenger compartment to the main fuselage.

The passenger compartment 12 is provided with a bottom wall 46 that is provided with a plurality of depending projecting lugs 48 disposed in mutually spaced relation for reception in sockets 50 on a hollow semispherical member 52 supported from the frame 16. As illustrated in Figure 10, a solenoid 54 is provided for actuating a slidable pin 56 for engagement with an aperture 58 in the lugs 48 wherein the pin 56 is slidable in a transverse bore 60 in the enlarged bracket 62 on the upper inner surface of the semispherical member 52 thereby permitting detachable engagement of the bottom 46 and the passenger compartment 12 with the frame 16 and the fuselage 14 thereby normally retaining the passenger compartment 12 in assembled relation, but permitting the passenger compartment 12 to be released therefrom when the solenoid 54 is energized. It will be understood that the control mechanism may be so arranged that when the solenoid 54 is energized during flight conditions, the solenoid actuating latch mechanism 44 is also energized for releasing the parachute 36, whereby the passenger compartment 12 may be safely lowered to the ground surface for permitting the passengers in the passenger compartment to land safely without injury. In the event the aircraft 10 may be employed for flying over large bodies of water, emergency propelling means may be provided in the form of an outboard motor or the like which may be stored in a suitable compartment within the passenger compartment wherein the outboard motor may be utilized for propelling and steering the passenger compartment to the nearest port in the event the passenger compartment 12 is released and lands in a body of water. Also, it is noted that the walls 20 and 18 as well as the bottom 46 may be constructed of water-tight material to assure that the passenger compartment 12 will remain afloat in the event it is landed in water, thereby assuring the safety of the passengers regardless of the position of the aircraft when an emergency situation arises.

Referring now specifically to Figure 4, it will be seen that the fuselage 14 is provided with a vertically disposed annular passage 64 for the passage of air wherein a suitable screen 66 or the like may be provided at the upper and lower edge of the opening 64 to prevent entrance of foreign objects such as animals or the like. The inner wall 68 of the passage 64 is divided into two sections and is provided with an annular bearing surface 70 which engages the outer surfaces of a pair of annular rings 72 and 74 which are substantially in the shape of an I-beam with roller bearings 76 disposed between the outer surfaces of the rings 72 and 74 and the bearing surfaces 70. A central annular member 78 is provided with roller bearings 80 disposed between each surface of the annular member 78 and the inner or facing surfaces of the annular rings 72 and 74, thereby retaining the annular members 72 and 74 in proper spaced relation and permitting rotation thereof with a minimum of friction. The inner surface of each of the annular rings 72 and 74 is provided with an inwardly extending annular projection 82 which forms an annular ring gear for engagement with a drive gear 84 which is disposed between the annular rings 72 and 74 and is in meshing engagement with the ring gears 82, thereby driving the annular rings 72 and 74 at the same speed in opposite directions. The drive pinion gear 84 as well as the ring gears 82 are of the double herringbone type, thereby eliminating radial thrust and eliminating the necessity for elaborate thrust bearing arrangements.

Figure 5:
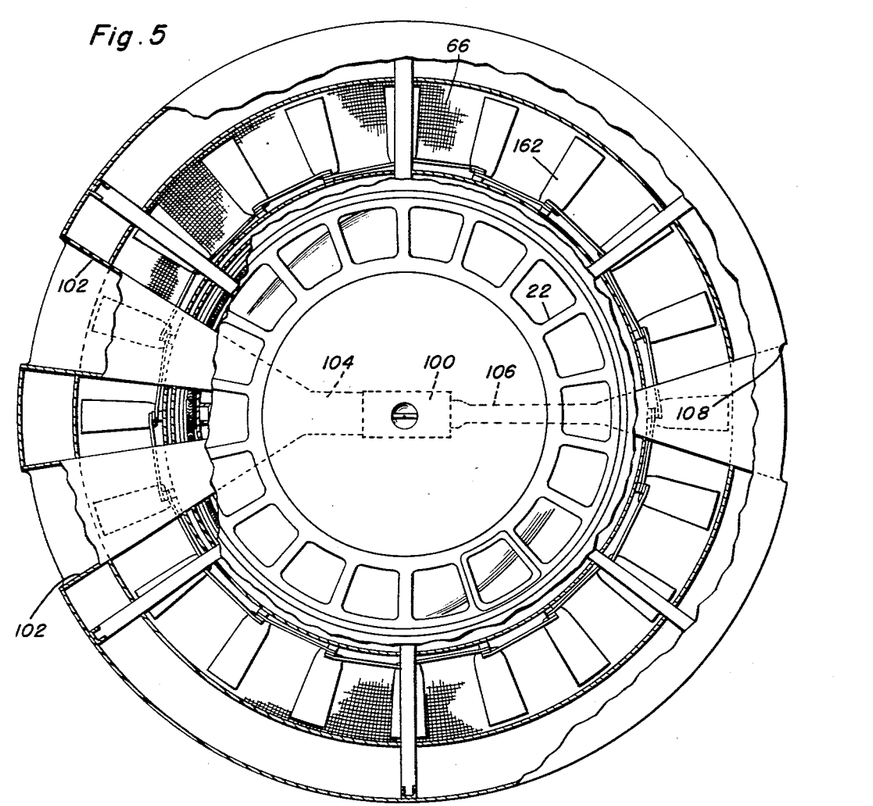
Figure 5 is a top plan view with portions thereof removed illustrating the construction and arrangement of the blades, the air inlets and outlets for the motor and other structural details.

The central portion of the fuselage 14 is provided with a horizontal wall 86 terminating in a vertical wall 88 at its outer end wherein the vertical wall forms an enclosure for the rings 72 and 74. The drive pinion gear 84 is provided with a stub shaft 90 extending through and journaled in the wall 88 wherein a telescopic drive shaft 92 interconnects the stub shaft 90 with an output shaft 94 on a transmission 96, wherein the drive shaft 92 is telescopic and provided with a universal joint 98 on each end thereof. The transmission 96 receives its power from a motor 100 which may be of any conventional type but is preferably of the gas turbine type wherein a pair of air inlets 102 are provided at the front of the aircraft 10, and these air inlets converge into a single passageway 104 and a single discharge pipe 106 is provided for discharging the exhaust gases from a single outlet 108 at the rear of the vehicle. The inlet pipes 102 are split into diverging pipes or passageways in order to permit positioning of the drive pinion 84 in direct alignment with the motor 100, thereby eliminating the necessity of an angular drive shaft. The passageways 102, 104 and 106 are so arranged that they extend outwardly between the rotating annular rings 72 and 74 and axially pass through the annular central support member 78 substantially as illustrated in Figure 4 and also in Figure 5.

The motor 100 is mounted on the top wall 110 of the supporting frame 16 and the conduits 102, 104 and 106 are provided with flexible couplings 112 to permit relative movement of the fuselage 14 and the frame 16. An upwardly extending hollow cylindrical member 114 is rigidly formed with the upper wall 110 of the frame 16 and is integrally connected to the hollow semispherical member 52 for attachment to the lower end of the passenger compartment 12, thereby illustrating the rigid interconnection between the passenger compartment 12 and the supporting frame 16. The transmission 96 on the motor 100 is provided with a power takeoff 116 for driving a telescopic drive shaft 118 through universal couplings 120 to a differential 122 for driving a transverse axle 124 having ground engaging wheels 126 mounted on the outer ends thereof for causing movement of the vehicle 10 when it is disposed on a supporting surface, such as a road. Also, the frame 16 is provided with a bottom closure wall 128 so that the air flow will not be disturbed by irregular surfaces.

The front of the frame 16 is supported by a rigid transverse axle 128 having wheels 130 journaled and pivotally mounted thereon together with steering arms 132 and steering linkage 134 for controlling the pivotal position of the steerable wheels 130 for guiding movement of the vehicle 10 when it is disposed on a road or other ground surface. Suitable shock absorbers 136 and spring means may be provided between the axles 128 and 124 for supporting the vehicle 10 in the usual manner. Also, the shock absorbers 136 may be provided for raising and lowering the wheels 130 and 126 for retraction thereof during flight of the vehicle 10, thereby eliminating air resistance of such wheels.

Figure 11:
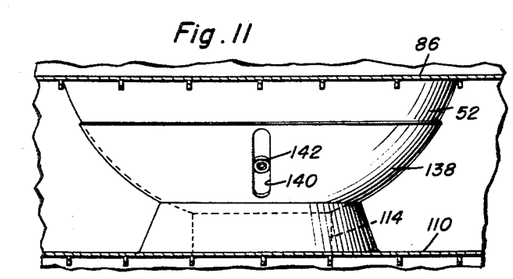
Figure 11 is a sectional view illustrating the universal attachment of the fuselage to the frame and the limiting means for limiting the movement thereof.

Disposed between the top wall 110 of the frame 16 and the wall 86 of the fuselage 14 is a plurality of compression coil spring members 137 which are of equal strength and are equally spaced from each other about the vertical center of the aircraft 10, thereby normally retaining the wall 86 in parallel relation to the wall 110 so that the annular rings 72 and 74 are disposed in horizontal relation. The wall 86 on the fuselage 14 is provided with an upwardly extending hollow spherical portion 138 for engagement with the spherical portion 52 secured to the frame 16 wherein universal pivotal movement of the fuselage 14 in relation to the passenger compartment 12 is provided. Inasmuch as it is only necessary to provide pivotal movement about a transverse axis, the spherical portion 138 is provided with a slot 140 having a roller 142 movably positioned therein wherein the roller 142 is journaled to the spherical portion 52 secured to the frame 16 thereby limiting the pivotal movement between the member 52 and the member 138 to movement about a substantially transverse axis wherein the fuselage 14 may be pivoted about a transverse axis to vary the horizontal plane of rotation of the annular rings 72 and 74 for a purpose described hereinafter.

The juncture between the passenger compartment 12 and the fuselage 14 is provided with a flexible connecting means 144 and the juncture between the frame 16 and the fuselage 14 is provided with a flexible connecting means 146, thereby permitting pivotal movement of the fuselage 14 in relation to the passenger compartment 12 and frame 16 without interrupting the smooth surfaces of the exterior of the aircraft 10 and also permitting removal of the passenger compartment 12 inasmuch as the flexible member 144 will become disengaged from either the passenger compartment 12 or the fuselage 14.

Figure 6:
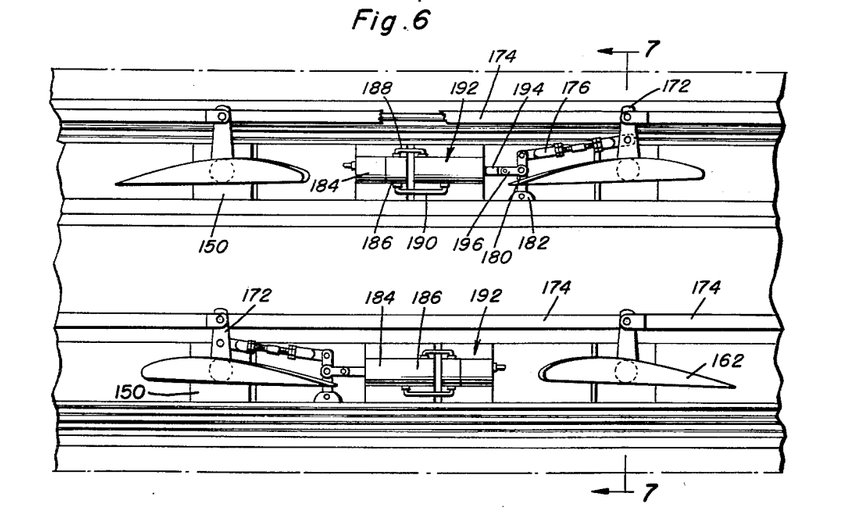
Figure 6 is an enlarged detailed elevational view illustrating the blades, their mounting and control means for varying the angle of inclination thereof.
Figure 7:
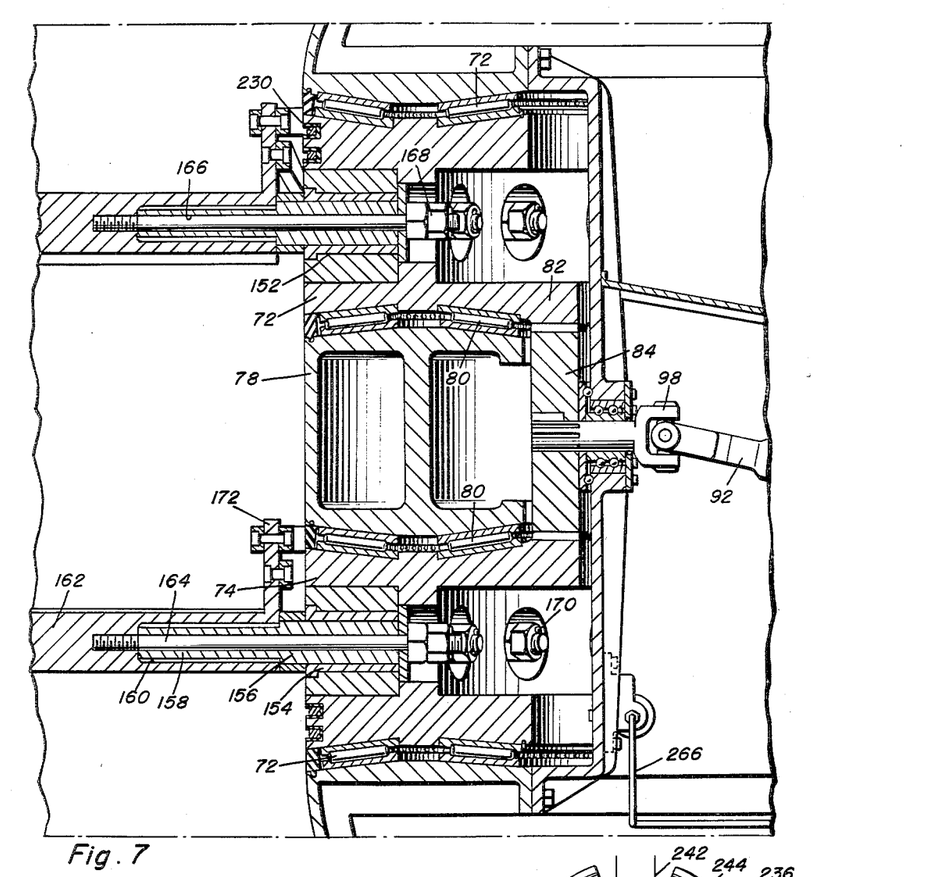
Figure 7 is a detail sectional view taken substantially upon a plane passing along section line 7—7 of Figure 6 illustrating the bearing construction of the annular ring members together with the drive pinion and ring gears associated therewith and further details of the blade pivoting means.

Referring now specifically to Figures 6 and 7, it will be seen that the outer surface of each of the I-beam-shaped annular rings 72 and 74 is provided with a series of bearing blocks 150 mounted therein having a bore 152 extending therethrough for receiving a cylindrical bearing member 154. A tubular member 156 is rotatably journaled in the bearing 154 and projects outwardly therefrom, as designated by the numeral 158, and the projecting portion 158 is received in a socket 160 in the inner end of a propeller blade 162 which extends radially from the rings 72 and 74. An elongated bolt 164 extends through a longitudinal passage 166 in the tubular member 156 and is in screw threaded engagement with the bottom of the bore 160 and is provided with lock nuts 168 on the inner end thereof together with suitable cotter pins 170 for locking the nuts 168 thereon. Each of the propeller blades 162 is provided with an upwardly extending offset arm 172 for a purpose described hereinafter.

All of the upstanding arms 172 on the upper blades 162 are interconnected by links 174 and all of the arms 172 on the lower propellers 162 are interconnected by similar arms 174. As illustrated in Figure 6, one of the upstanding arms 172 is provided with an adjustable arm 176 attached thereto between the inner and outer ends of the arm 172 with the free end of the arm or link 176 connected to a link 180 which is supported from a bracket 182 on the annular ring 72 or 74. An electric motor 184 is connected to a fluid pump 186 which, in turn, is provided with conduits 188 and 190 for actuating a reciprocating fluid pressure actuated piston and cylinder arrangement 192 which operates as a fluid motor and is provided with a reciprocating piston rod 194 having a pivot link 196 interconnecting the end of the piston rod 194 and the center of the link 180 wherein reciprocation of the piston rod 194 will cause pivotal movement of the associated arm 172, thereby pivoting the propellers 162 about the longitudinal axis formed by the attaching bolt 164.

Figure 8:
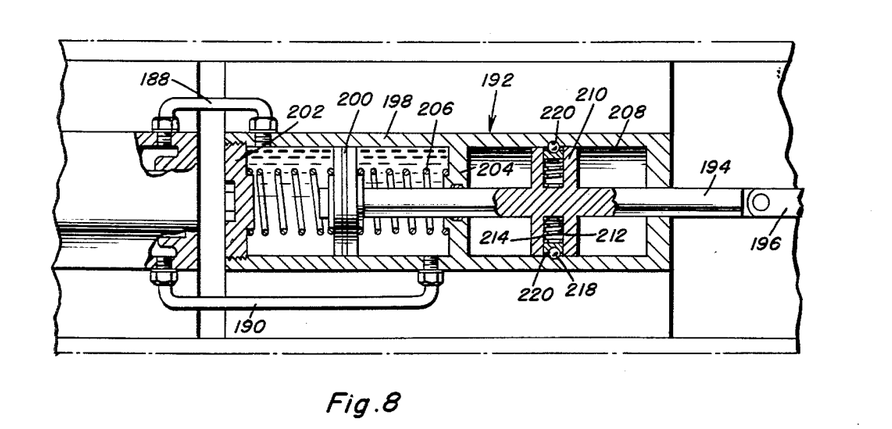
Figure 8 is a detail sectional view showing the construction of one of the control mechanisms for pivoting the blades about their longitudinal axes.

As illustrated in Figure 8, the fluid motor 192 includes a cylinder 198 having a piston 200 reciprocable therein with the piston rod 194 attached thereto. The inner end of the cylinder 198 is provided with a closure plug 202 and the other end thereof is provided with a closure wall 204 with a compression spring 206 disposed on each side of the piston 200 between the piston 200 and the respective walls 202 and 204. The conduit 188 is in communication with one side of the piston 200 while the conduit 190 is in communication with the other side of the piston 200 for reciprocating the piston 200 upon proper application of pressure in the lines 188 and 190, thereby reciprocating the piston rod 194 as desired for controlling the position of the propellers 162. The cylinder 198 is provided with an extension portion 208 for receiving radial members 210 formed on the rod 194 wherein the radial members 210 are provided with hollow bores 212 having compression coil springs 214 thereon with ball members 218 at the outer end thereof together with a seat 220 between the ball members 218 and the springs 214. The ball members 218 engage indentations 220 on the inner wall of the cylinder 208. When the piston 200 is in a neutral position, the spring urged balls 218 are positioned in the indentations 220 which will automatically position the blades 162 to a neutral or normal position. This arrangement on each of the loaders or rings 72 and 74 permits automatic centering of the blades 162.

Figure 14:
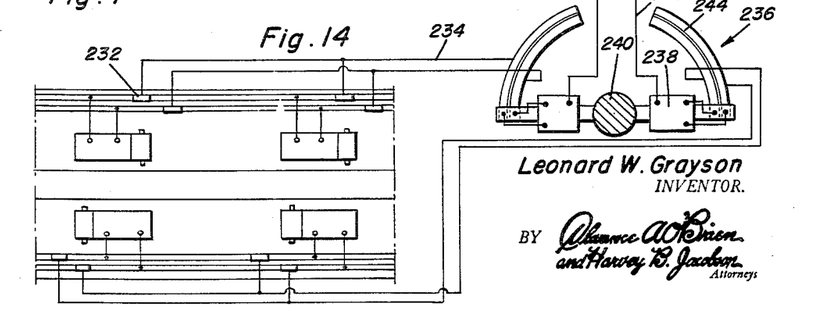
Figure 14 is a diagrammatic view of the control mechanism for varying the angular relationship or the pitch of the blades of the propeller for controlling the direction of flight of the aircraft in a horizontal plane.

It is noted that each of the rings 72 and 74 is provided with a pair of conductive pick-up rings 230 for selectively driving the motor 184 in one direction or the other, depending upon which pick-up ring 230 is energized. The pick-up rings 230 are energized by contact members 232 which are interconnected by electric conductors 234 to a control switch generally designated by the numeral 236 which includes switch members 238 mounted on a steering column 240 wherein each switch 238 is provided with a ground wire selectively engageable with arcuate member 244 for selectively energizing one set of contacts 232 and pick-up rings 230. It will be noted that the control mechanism for the upper set of blades 162 is dependent upon the control unit of the lower set of blades 162 wherein the pitch or angle of the blades 162 in the upper set or lower set may be varied thereby controlling the required torque for rotating the blades 162 about the vertical axis of the rings 72 and 74, wherein the difference in torque will rotate the fuselage 14 about the vertical axis for controlling the direction of horizontal flight of the aircraft. The control switch mechanism generally designated by the numeral 236 is controlled directly by the steering wheel 245 in the control area of the passenger compartment 12.

For controlling the angle of inclination and climb of the aircraft 10, fluid motor mechanism generally designated by the numeral 246 is provided in between the wall 110 of the frame 16 and the wall 86 of the fuselage 14 for selective contraction and expansion for varying the angular position of the fuselage 14 in relation to the frame 16 and the passenger compartment 12.

Figure 13:
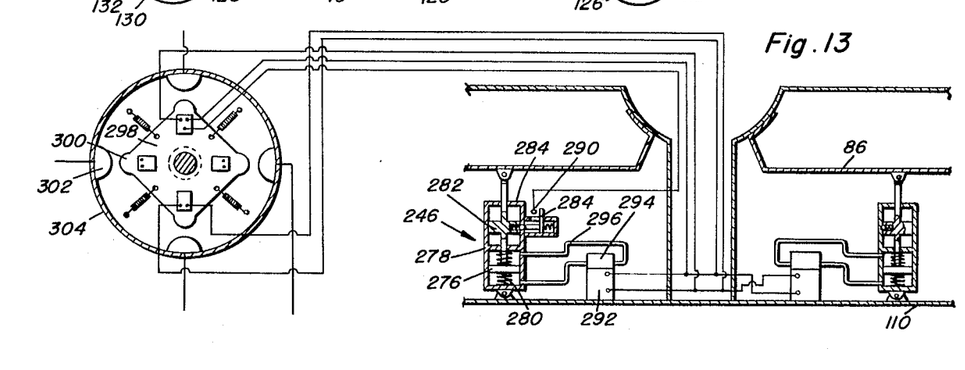
Figure 13 is a diagrammatic view illustrating the construction of the control mechanism for varying the angular relation of the fuselage and the supporting frame.

Referring now specifically to Figure 13, it will be seen that the details of the fluid motor 246 are specifically illustrated. The fluid motor 246 includes a piston 276 mounted in a cylinder 278 wherein the cylinder 278 is mounted to the wall 110 of the frame 16 and the piston rod is mounted to the wall 86 of the fuselage 14. The piston 276 is provided with centralizing springs 280 for returning the device to a normal position, and a slidable member 282 is provided with a spring urged detent 284 for contact with a slidable plunger 286 when the device is in neutral position, wherein the plunger 286 is moved to a position for breaking contact with a contact point 290. Suitable electric motor 292 and a fluid pump 294 actuated thereby are provided with conduits 296 for selectively extending the piston 276 in one of two directions. Suitable electric conductors are provided for rotating the motor 292 in one direction or the other, whereby the movement of the fuselage 14 may be controlled. A central control mechanism 298 is provided with corner contacts 300 in alignment with contacts 302 on a cylindrical member 304 wherein pivotal movement of the central member 298 in any direction will cause contact with one of the contacts 302, thereby energizing the proper motor 292 in the proper manner for tilting the fuselage 14 in that direction, thereby causing the fuselage to be propelled in that direction.

Figure 9:
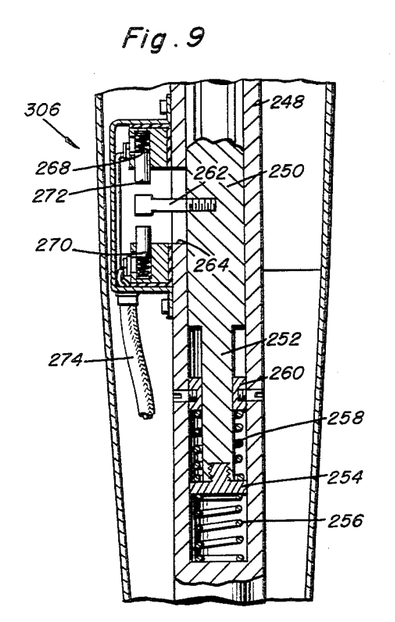
Figure 9 is a detail sectional view illustrating the means for controlling the flight of the aircraft in a vertical plane.

For climbing, control mechanism 306 is provided on the steering column for changing the pitch of the propeller blades 162 by vertical movement of the steering wheel 245. The mechanism 306 is illustrated in Figure 9 and includes a tubular internally splined member 248 telescopically receiving the lower splined end of the steering column 250 wherein the lower end of the column is reduced and extends longitudinally therefrom as indicated by numeral 252. An enlarged head 254 is provided on the free end of the reduced portion and a spring 256 is disposed on the outer surface of the head 254 and is seated in the closed bottom of the tubular member 248. A second spring 258 is disposed on the other side of the head 254 and seats against a collar 260 mounted in the tubular member 248 thereby equalizing the spring 256 for retaining the blades 162 in a normal position. A projection 262 is mounted on column 250 and extends through slot 264 in member 248 for selective engagement with oppositely disposed plungers 270 and 272 of a switch 268 for supplying electrical energy through conductor 274 for selectively suplying energy to the blade pitch control mechanism 192. In controlling operation of the invention, vertical lift and descent is provided by altering the speed of the propeller blades by a conventional throttle mechanism. By altering the pitch of one ring of propeller blades, the vehicle may be caused to rotate about substantially a vertical axis due to the increased reaction force exerted by the ring of blades having the greatest pitch. Thus, the position of the body and frame of an entire aircraft about a vertical axis may be controlled by controlling the pitch of the individual rings of blades and after the desired horizontal direction is obtained, the blades are set in an equal or standard pitch which will maintain the horizontal direction about the vertical axis. In varying the angle of inclination of climb of the vehicle, the pivotal movement between the fuselage in relation to the passenger compartment actually alters the relationship between the center of gravity of the device and the line of thrust created by the propeller blades.

When expansion and contraction of the pistons 276 is accomplished, this causes relative pivotal movement between the fuselage section 14 and the passenger carrying compartment 12 and the frame structure attached thereto. It is pointed out that the rotors or rings with the blades of propellers thereon are mounted on the fuselage with there being no relative pivotal movement between the rotors and fuselage thus providing a relative pivotal movement between the passenger compartment as one element and the fuselage with the rotors mounted thereon as another element.

When relative pivotal movement between the fuselage 14 and passenger compartment 12 is accomplished, one of these members must pivot and the other stays stationary or both members may be said to pivot in relation to each other. This relative pivotal movement between the fuselage and passenger compartment provides a shifting of the center of gravity of the device in relation to the line of thrust of the propellers or blades. With this basis, it is pointed out that when it is desired to achieve forward movement from a hover position, the control mechanism is moved to a position to move fuselage 14 down in front and up in the rear in relation to the passenger compartment which may be considered to move up in front and down in the rear relative to the fuselage 14.

Thus, with the rotors rotating in the same plane as the fuselage 14, the shifting of the center of gravity will cause a shift in the angular position of the line of thrust caused by the rotating blades inasmuch as it is axiomatic that the line of thrust and center of gravity in this type of device tend to coincide. Thus, when the center of gravity is shifted away from the line of thrust, the tendency is for the line of thrust to coincide with the center of gravity thus providing directional control dependent upon the direction of shift of the center of gravity in relation to the line of thrust.

Therefore, when it is desired to move the aircraft backward and upward from a hover position, the control mechanism is shifted in such a manner as to bring the fuselage 14 up in front and down in the rear and out of parallel with the passenger compartment 12. This provides a shifting of the center of gravity in relation to the line of thrust which provides a directional control inasmuch as the line of thrust is shifted towards a position that would be coincidental with the line of thrust which shifting is prevented by the mechanism for varying the relationship between the passenger compartment and fuselage. When right and left directions are desired, the control mechanism is moved in such a manner to correspondingly tilt the fuselage down on the side thereof that the device is to move. In other words, the fuselage 14 is tilted down or the passenger compartment 12 is tilted up at the side thereof to which the aircraft is desired to be moved. Thus, by controlling the aircraft about a vertical axis as described previously, the variation in pitch of the blades being used for this purpose, and the variation in the relationship between the line of thrust and center of gravity, directional control of the aircraft is accomplished.

To control the craft in fast flight when jet propulsion is the source of power instead of the rotors, the air intake of the rotors will be closed off for making a smooth airfoil over the entire craft to lessen the drag. Control of the craft is then achieved in the same manner, that is by moving the control wheel, in the desired direction, which will tilt the fuselage 14 in the desired direction. It is well known that the pilot must have the power to roll the craft around the longitudinal axis thereof. Also, the pilot must be able to control the craft for climb and dive to achieve directional flight. In order to roll the craft around the longitudinal axis to the right, the steering mechanism is moved to the right which, in turn, moves the fuselage 14 down on the right side and up on the left side at a parallel with the passenger compartment 12 thus creating more air pressure drag or area on the upward forward quarter section of the passenger compartment 12 and fuselage 14 and the same air pressure drag area on the forward lower left quarter section of the frame and fuselage 14 and less air pressure area on the areas opposite those just mentioned thus causing a rolling action around the longitudinal axis. As another precaution, the pilot must be able to turn the craft so that the front of the craft is maintained in the direction of flight at all times. This is accomplished by permitting the rotors to rotate at a low r.p.m. during the jet propulsion speeds so that the craft may be controlled about a vertical axis by varying the pitch of the blades in the manner set forth previously.

In an analogy concerning the shifting of the center of gravity and the line of thrust, it is submitted as a comparison that when the center of gravity of a conventional airplane is shifted such as when a number of passengers move from front to rear or the load moves from front to rear, it is necessary for the pilot to properly adjust the controls of the airplane to maintain a line of flight. If a horizontal line of flight were maintained with the load in one condition and the load subseqently moved rearwardly, the center of gravity and line of thrust would shift in relation to each other and all other things being equal, the aircraft would then begin a steady climb as long as the power was sufficient to maintain such a climb. Thus, with the various controls, the pilot or operator of the aircraft is capable of controlling the aircraft in all phases of its flight and also controlling the aircraft when it is propelled on the ground surface such as when it is used as a ground vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combined air and land vehicle comprising an enlarged disk-shaped body having a passenger compartment disposed at the top thereof, a supporting frame mounted on the bottom thereof, ground engaging wheels on said frame, said body having an annular vertical air passage, a pair of counterrotating vertically spaced annular rings mounted on said body and at the inner edge of said passage, a plurality of radial propeller blades mounted on each of said rings and disposed in the passage for vertically lifting the body upon rotation of the blades, centrally disposed power means in the body for driving said rings and propeller blades at equal speeds, each of said annular rings having an annular ring gear thereon, said gears being disposed in facing relation, said ring drive means including a drive pinion gear disposed between the ring gears and in meshing engagement therewith, a drive shaft connected to said pinion, a transmission connected to the drive shaft, and a power source connected to the drive shaft for selectively rotating said blades, said blades being pivotally mounted on said rings for pivotal movement about their longitudinal axes for varying the pitch of the blades thereby controlling the direction of horizontal flight by varying the torque necessary for rotating the rings and varying the reaction force caused by the blades, means connected to the blades for varying the pitch thereof, said body and frame having interconnecting springs to urge the body and frame of the vehicle to a level condition, fluid pressure actuated piston and cylinder arrangements interconnecting the frame and body for tilting the rotational axis of the rings and blades in relation to the center of gravity line of the frame and passenger compartment thereby controlling the angle of climb and the speed of movement of the vehicle due to inclination of the line of thrust caused by the tendency of the line of thrust and center of gravity to coincide, said frame and passenger compartment being rigid with each other, and said body being universally adjustable in relation thereto for controlling the angular position in relation to the frame and compartment, said spring means between the frame and body including a plurality of mutually spaced coil compression springs of equal strength to return the body to a level relation with the frame and passenger compartment.

2. An aircraft comprising a fuselage having a vertically disposed annular air passage, counterrotating vertical spaced rows of variable pitch propeller blades rotatably mounted on said fuselage and disposed radially in said passage for lifting the fuselage upon rotation of the blades, power means disposed within the fuselage and connected to the blades for driving said blades at various equal speeds for varying the lifting force exerted by the blades, power means connected to the blades for independently varying the pitch of the rows of blades thus varying the reaction force exerted by the rows of blades about their center of rotation for causing rotation of the fuselage about a generally vertical axis coincident with the center of rotation of the blades for controlling the position of the fuselage about a vertical axis, a passenger compartment pivotally mounted on said fuselage, power operated means interconnecting the fuselage and passenger compartment for altering the angular position of the passenger compartment in relation to the fuselage thereby altering the relationship of the center of gravity of the aircraft and line of thrust provided by the blades thereby varying the inclination of the line of thrust for controlling the direction of the horizontal component of thrust thereby controlling flight of the aircraft.

3. The structure as defined in claim 2 together with a pair of vertically spaced annular members mounted rotatably on said fuselage in spaced parallel relation; means mounting the blades on said annular members for rotation about the longitudinal axis of the blades, a drive shaft connected to the power means, and a rotatable drive member connected to said drive shaft and disposed vertically between the annular members with the upper and lower peripheral edges thereof drivingly engaging the facing surfaces of the annular members thereby driving the annular members in opposite rotational directions at the same speed.

References Cited in the file of this patent

UNITED STATES PATENTS

| | | |
|---|---|---|
| 1,760,061 | Horni | May 27, 1930 |
| 1,876,682 | Janney | Sept. 13, 1932 |
| 2,110,563 | Thaon | Mar. 8, 1938 |
| 2,308,764 | Makaroff | Jan. 19, 1943 |
| 2,377,835 | Weygers | June 5, 1945 |